Patented Nov. 7, 1922.

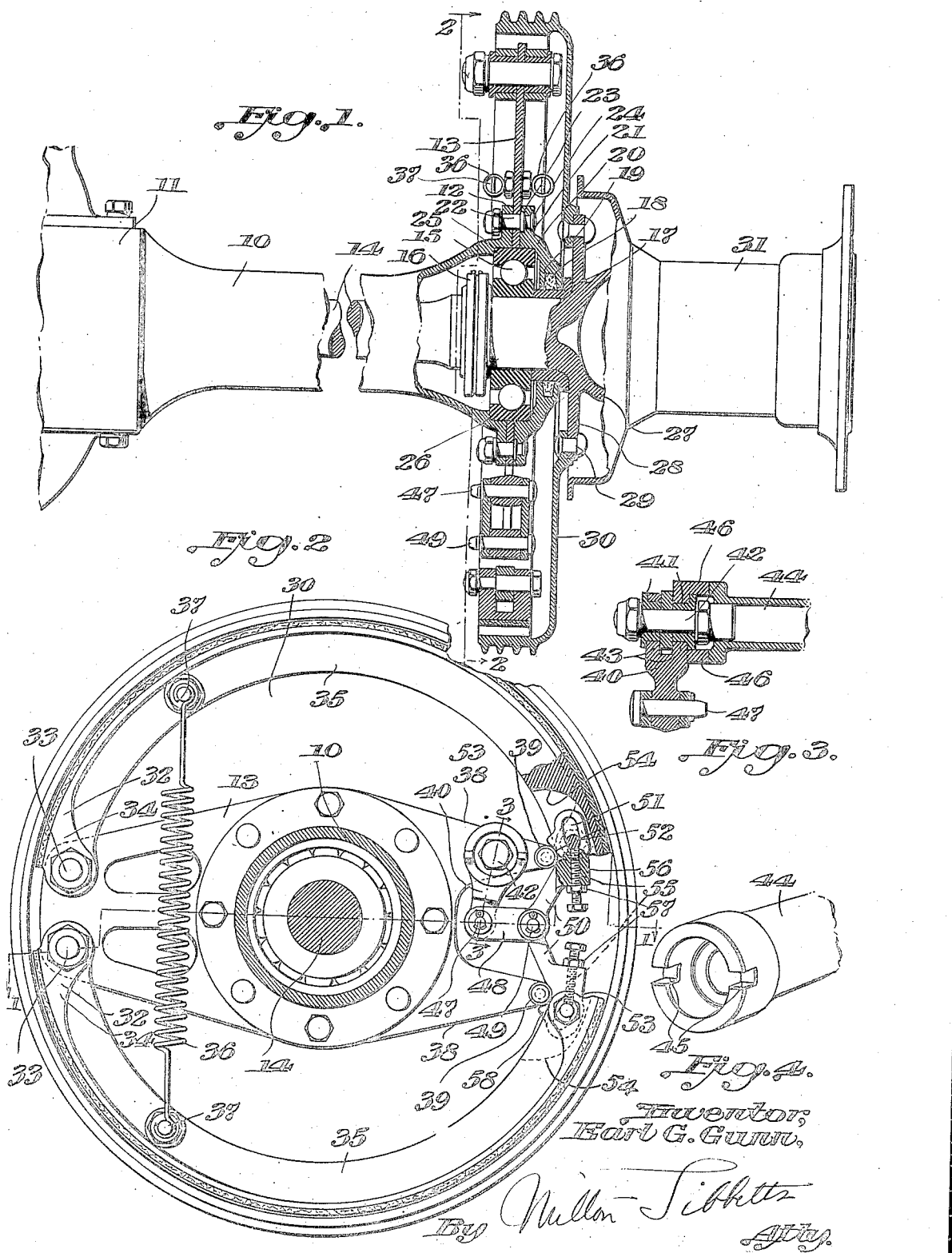

1,434,611

UNITED STATES PATENT OFFICE.

EARL G. GUNN, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed December 17, 1919. Serial No. 345,451.

*To all whom it may concern:*

Be it known that I, EARL G. GUNN, a citizen of the United States, and resident of Detroit, Wayne County, State of Michigan, have invented certain new and useful Improvements in Motor Vehicles, of which the following is a specification.

This invention relates to motor vehicles and more particularly to brake mechanism for such vehicles.

The invention has for its object to provide means for compensating for the wear between the coacting parts of the brake mechanism whereby the length of service of the brake and the effectiveness of the braking action are increased.

Another object of the invention is to provide means for taking up the wear between the coacting parts of the braking mechanism whereby the same length of throw of the operating members will produce substantially the same braking action after the parts have been worn as when the parts were new.

Another object of the invention is to provide a mounting for motor vehicle brakes of simple and efficient construction and comprising few parts.

Another object of the invention is to provide a construction in which the braking elements are so mounted that they may be assembled prior to being secured in place on the motor vehicle.

Other objects of the invention than those specifically stated above will be apparent from the following description taken in connection with the drawings, in which:

Figure 1 is a horizontal sectional view through the improved brake mechanism taken substantially on line 1—1 of Figure 2;

Figure 2 is a sectional view, partly broken away, taken on line 2—2 of Figure 1;

Figure 3 is a sectional detail view taken on line 3—3 of Figure 2, and

Figure 4 is a detail view in perspective illustrating one of the operating parts shown in Figure 3.

The brake mechanism is mounted, as is usual, on an axle tube or casing 10 of the rear axle of a motor vehicle, a portion 11 of the central housing being shown in Figure 1, this housing enclosing the usual transmission mechanism. The tubular casing 10 is provided at its outer end with an outwardly extending annular flange 12 to which is bolted a brake shoe supporting member 13 which is preferably formed of stamped steel plate as illustrated in Figure 1.

The axle section 14 is supported at its inner end in any suitable manner in the casing 10 and preferably in such a way that it may be withdrawn longitudinally from the casing. At its outer end the section 14 is supported in ball bearings 15, the inner race of which is mounted on the axle section or shaft between a screw threaded collar or nut 16 and a flanged collar 17. Felt packing 18 is mounted on the collar 17 and is received by a recess 19 formed in the collar 20, which in turn is provided with an outwardly extending annular flange 21. The flange 21 of the collar 20 is secured to the brake shoe supporting member or plate 13 by means of bolts 22 which also secure the plate 13 to the flange 12 of the axle tube 10, shoulders 23 on the bolt 22 engaging the surface of the plate 13 and the bolts preferably being headed over as shown at 24 to secure the bolts to the flange 21.

As will be seen from the showing in Figure 1, the outer ball race 25 is positioned between the collar 20, and a recessed portion 26 of the axle tube, being retained in this position by the bolts 22 which secure the collar 20 and plate 13 to the flange 12 of the axle tube. The axle section 14 may be of any suitable construction at its outer end but in the form of the invention illustrated this member is enlarged as shown at 27 and is provided with a laterally extending flange 28 to which is secured by means of rivets 29 the brake drum 30. The enlarged portion of the end of the axle forms an inner hub upon which is mounted a hub 31 of a wire wheel.

The mounting of the brake shoes and the operating mechanism for the brake shoes is illustrated in detail in Figure 2 and will now be described.

The brake shoes 32 are pivotally mounted as shown at 33 at one end of the supporting plate 13, each of the shoes being provided at its pivoted end with a pair of alined, spaced, lugs 34 through which the pivot pins extend. Each of the shoes is provided with a centrally disposed strengthening rib 35 which extends substantially throughout the length of the shoe and a spring 36 engages, at its opposite ends, pins 37 carried by the ribs 35, the spring acting to retract the shoes after the shoe actuating means has been released.

The supporting plate 13 is bifurcated at its lower end as shown at 38, the bifurcated portions 38 being provided with laterally extending lugs 39, which may take the form of rivets if desired, these lugs acting as stops to limit the inward movement of the shoes, in a manner hereinafter described.

The brake shoe actuating mechanism comprises an arm 40, shown in detail in Figure 3, and pivotally supported on flanged bushings 41 carried by a transversely extending pin 42 mounted on one of the bifurcated portions 38 of the supporting plate, the pivoted end of the arm 40 being bifurcated as shown at 43. This arm may be actuated in any suitable manner and in the form of the invention shown is actuated by means of a tubular rod 44 which is provided with diametrically opposed slots 45 which engage outwardly extending lugs 46 formed on one of the bifurcated portions of the arm 40. It will of course be understood that the rod 44 is connected in the usual manner with an operating lever or foot pedal on the vehicle. At its free end the actuating arm 40 carries a pivot pin 49, upon which is pivotally mounted a link 48, the lower end of which is pivotally connected by a pin 49 to a pair of toggle links 50. The links 50 are slotted at their free ends as shown at 51, the slots receiving transversely extending pins 52 carried by alined ears 53 formed on the free ends of the brake shoes. The central ribs 35 of the brake shoes are cut away as shown at 54 to permit the entrance of the slotted free ends of the toggle links 50 between the ears 53.

As is well known, the coacting parts of the brake mechanism of a motor vehicle receive hard wear and to compensate for this wear between the coacting parts the toggle links 50 are provided with adjustable screws 55 which are threaded into offset portions 56 formed on the links and are positioned in such a manner that they extend into the slots 51 formed in the free ends of the links and vary the effective lengths of these slots after they are adjusted. Lock nuts 57 are carried by the screws 55 to retain them in adjusted position. The free ends of the toggle links 50 are also provided with outwardly extending lugs 58 which are adapted to engage the lugs 39 carried by the lower ends of the bifurcated portions 38 of the supporting plate 13, thereby limiting the inward movement of the brake shoes caused by the spring 36.

The operation of the brake mechanism may be briefly described as follows: When the operator desires to throw the braking mechanism into operation, the rod 44 is rotated by means of suitable hand or foot mechanism, whereupon the arm 40 is rotated, moving the link 48 in a direction toward the brake drum and thereby forcing the toggle links 50 about the pivot pin 49 in a direction to cause the brake shoes to engage the brake drum. After the brake mechanism has been used for a considerable length of time and the brake shoes and brake drum have become worn, the screws 55 may be adjusted in a manner to cause the inner ends thereof to enter the slots 51 of the toggle links thereby decreasing the effective lengths of these slots in order to compensate for the wear. After this adjustment has been made the actuation of the arm 40 and the toggle links 50, to the same extent as when the brake mechanism was new, will cause the same braking action to take place. In other words, the effective braking action caused by the normal movement of the operating mechanism has not been diminished by the wear on the cooperating parts.

When the actuating mechanism for the brake has been released the spring 36 retracts the shoes to their normal position, in which position the lugs 58 carried by the toggle links 50 engage the lugs 39 carried by the lower bifurcated ends of the supporting plate 13.

From the above description it will be seen that a simple and effective brake mechanism has been devised and moreover a mechanism by means of which the wear between the coacting parts may be compensated for, thereby increasing the life of the brake. It will also be seen that the mechanism has been mounted upon the supporting member or plate in such a manner that all the operating parts thereof may be assembled before placing the brake in position on the motor vehicle, thus permitting of the necessary adjustments to be made prior to the shipment of the braking mechanism from the factory.

While one embodiment of the invention has been specifically described and illustrated, it should be understood that the invention is capable of modification and that modifications and changes may be made in the construction and in the arrangement of the cooperating parts without departing from the spirit or scope of the invention as expressed in the following claims.

What I claim and desire to secure by Letters Patent is:

1. Brake mechanism comprising a drum, a pair of brake shoes adapted to coact therewith, means including toggle links for moving said shoes into engagement with said drum, said links being connected to said shoes through pin and slot connections, and adjustable means for varying the effective lengths of said slots.

2. Brake mechanism comprising a drum, a pair of brake shoes adapted to coact therewith, means including toggle links for moving said shoes into engagement with said drum, said links having slots adjacent their free ends, pins carried by said brake shoes and disposed in said slots, and means carried by said links for varying the effective lengths of said slots.

3. Brake mechanism including, in combination, a supporting member, brake shoes pivoted thereon, an arm pivoted on said supporting member, and toggle links operatively connected to said arm and to said shoes for swinging said shoes about their pivots into engagement with said drum.

4. Brake mechanism including, in combination, a drum, a supporting member, brake shoes pivoted thereon, means for moving said brake shoes about their pivots into engagement with said drum, and stops carried by said supporting member for limiting the movement of said brake shoes away from said drum.

5. Brake mechanism including, in combination, a drum, a supporting plate, brake shoes pivoted thereon, an arm pivoted on said supporting plate, and toggle links operatively connected to said arm and to said brake shoes for moving said brake shoes into engagement with said drum.

6. Brake mechanism including, in combination, a drum, a supporting plate, brake shoes pivoted thereon, an arm pivoted on said supporting plate, and toggle links adjustably connected to said shoes and operatively connected to said arm.

7. Brake mechanism including, in combination, a drum, a supporting plate bifurcated at one end, brake shoes pivoted to said plate at the opposite end, an arm pivoted on one of the bifurcated portions of said plate, a link pivoted to said arm, and toggle links pivotally connected to said last named link and operatively connected to said brake shoes.

8. Brake mechanism including, in combination, a drum, a supporting plate bifurcated at one end, brake shoes pivoted to said plate at the opposite end, an arm pivoted on one of the bifurcated portions of said plate, a link pivoted to said arm, and toggle links pivotally connected to said last named link and adjustably connected to said brake shoes.

9. Brake mechanism including a drum, a supporting member, brake shoes adapted to cooperate therewith, actuating means for said brake shoes including toggle links, and means carried by said toggle links and adapted to engage said supporting member for limiting the movement of said brake shoes in a direction away from said drum.

In testimony whereof I affix my signature.

EARL G. GUNN.